(12) United States Patent
Yuan et al.

(10) Patent No.: US 11,356,000 B2
(45) Date of Patent: Jun. 7, 2022

(54) ELECTRIC MACHINE COOLING WITH ROTOR HAVING COOLING PIPE

(71) Applicant: FORD GLOBAL TECHNOLOGIES, LLC, Dearborn, MI (US)

(72) Inventors: Yigang Yuan, Jiangsu (CN); Chuan Deng, Jiangsu (CN); Joy Gong, Jiangsu (CN); Guohua Du, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 322 days.

(21) Appl. No.: 16/739,630

(22) Filed: Jan. 10, 2020

(65) Prior Publication Data

US 2020/0295626 A1 Sep. 17, 2020

(30) Foreign Application Priority Data

Mar. 13, 2019 (CN) .......................... 201910190351.6

(51) Int. Cl.
*H02K 9/19* (2006.01)
*F28D 15/02* (2006.01)

(52) U.S. Cl.
CPC .......... *H02K 9/19* (2013.01); *F28D 15/0275* (2013.01)

(58) Field of Classification Search
CPC .. H02K 5/20; H02K 5/02; H02K 5/04; H02K 5/08; H02K 9/16; H02K 9/19; H02K 9/18; H02K 9/197; H02K 9/20; H02K 9/06; H02K 9/14; H02K 7/116; H02K 7/14; H02K 9/083; H02K 9/006; H02K 9/08; B60K 7/0007; B60K 7/00; B60K 17/14; B60K 17/046; B60K 17/12; B60K 2007/0038; B60K 2007/0092; F16H 57/0426; F16H 57/048; F16H 57/0452; F16H 57/0441; F16H 57/043; F16H 57/0471; F16H 57/0409; F16H 57/0423; F16H 57/0476; B60Y 2306/03
See application file for complete search history.

(56) References Cited

U.S. PATENT DOCUMENTS

| 9,680,351 | B2 | 6/2017 | Boxberg et al. |
| 10,008,907 | B2 | 6/2018 | Hanumalagutti et al. |
| 2018/0048202 | A1* | 2/2018 | Kumagai ................. H02K 1/27 |
| 2018/0131247 | A1 | 5/2018 | Froehlich et al. |
| 2018/0375395 | A1* | 12/2018 | Yamagishi ............... H02K 1/32 |

FOREIGN PATENT DOCUMENTS

| CN | 203734394 U | 7/2014 |
| CN | 203734395 U | 7/2014 |
| CN | 204243930 U | 4/2015 |
| CN | 206585445 U | 10/2017 |
| CN | 107623390 A | 1/2018 |

* cited by examiner

*Primary Examiner* — Bryan R Perez
(74) *Attorney, Agent, or Firm* — Brooks Kushman PC; David Kelley

(57) ABSTRACT

A motor and stator include first and second laminations arranged adjacently in the axial direction. The laminations include sub-yoke parts and first tooth parts. The sub-yoke parts are spliced through a yoke engaging part to form a substantially annular yoke part. The tooth parts are assembled on an inner edge of the yoke part through a tooth engaging part. A first tooth engaging part and a second tooth engaging part are superposed in the axial direction, the first tooth engaging part being different from the second tooth engaging part. A method of manufacturing a stator for a motor is also disclosed.

19 Claims, 10 Drawing Sheets

ELECTRIC MACHINE COOLING WITH ROTOR HAVING COOLING PIPE

CROSS-REFERENCE TO RELATED APPLICATIONS

This application claims foreign priority benefits under 35 U.S.C. § 119(a)-(d) to CN Application 2019 101 903 51.6 filed Mar. 13, 2019, which is hereby incorporated by reference in its entirety.

TECHNICAL FIELD

The present application relates to an electric machine having a rotor with a cooling pipe.

BACKGROUND

Electric machines may be operated as motors and/or generators, although often simply referred to as electric motors and are widely used in vehicles and other fields. Typically, a motor consists of a rotor in the center and a roughly cylindrical stator. The rotor can be rotatably supported on a rotor shaft. Cooling can be provided for the rotor and the stator windings by means of a passage in a rotor core and a stator core respectively. Various cooling strategies may be seen in the prior art.

Chinese patent CN107623390A discloses a motor having a cooling pipe, in which the motor is a totally enclosed fan-cooled traction motor. The motor comprises: a motor inlet, a motor outlet and a stator. A plurality of stator cooling pipes is arranged along the inner circumferential direction of the stator. The cooling pipes are respectively in communication with the motor inlet and the motor outlet; and a plurality of turbulence blocks are arranged on the inner walls of the stator cooling pipes. The same patent further discloses a cooling pipe in a rotor; the cooling pipe in the rotor is also in communication with the motor inlet and the motor outlet and turbulence blocks are also arranged in the rotor cooling pipe.

SUMMARY

According to one aspect of the present application, a motor rotor having a cooling pipe may comprise a first rotor segment, wherein the first rotor segment is provided with a plurality of first axial through holes, each first axial through hole comprising a first group of turbulence blocks distributed circumferentially, and a plurality of first turbulence blocks of the first group of turbulence blocks are spaced apart by first gaps. The rotor may comprise a second rotor segment, wherein the second rotor segment is provided with a plurality of second axial through holes, each second axial through hole comprising a second group of turbulence blocks distributed circumferentially, and a plurality of second turbulence blocks of the second group of turbulence blocks are spaced apart by second gaps. In an axial cooling passage, the first turbulence blocks are at least partially aligned with the second gaps, and the second turbulence blocks are at least partially aligned with the first gaps.

In one embodiment, the first rotor segment and the second rotor segment have the same structure. When the first rotor segment and the second rotor segment are superposed in an axial direction to form the rotor, the first axial through holes and the second axial through holes are aligned to form axial cooling passages. The first rotor segment and the second rotor segment rotate around a central axis such that the first turbulence blocks are at least partially aligned with the second gaps and the second turbulence blocks are at least partially aligned with the first gaps.

In another embodiment, the first rotor segment and the second rotor segment are respectively formed by superposing a plurality of electromagnetic steel sheets with the same structure.

In another embodiment, the rotor is formed by superposing a plurality of first rotor segments and second rotor segments; the plurality of turbulence blocks are protrusions in the axial cooling passages, and the plurality of turbulence blocks of two adjacent groups are staggered from each other along the axial direction.

In still another embodiment, the plurality of turbulence blocks of two adjacent groups are provided with different heights.

In yet another embodiment, the rotor comprises a plurality of pairs of first magnets and second magnets embedded thereinto; the axial cooling passage is provided with a first cooling inner wall adjacent to the first magnets and a second cooling inner wall adjacent to the second magnets; and the plurality of turbulence blocks are formed on the first cooling inner wall and the second cooling inner wall.

In yet another embodiment, the first magnets and the second magnets form a V shape on a cross section of the rotor; the first cooling inner walls of the axial cooling passages are basically in parallel with the first magnets; the second cooling inner walls are basically in parallel with the second magnets, and the axial cooling passages further comprise third cooling inner walls connecting the first cooling inner walls and the second cooling inner walls.

In another embodiment, the first cooling inner wall, forming a part of the first axial through hole, of the first rotor segment comprises N turbulence blocks, and the second cooling inner wall comprises (N−1) turbulence blocks, wherein the first cooling inner wall, forming a part of the first axial through hole, of the second rotor segment comprises N turbulence blocks, and the second cooling inner wall comprises (N−1) turbulence blocks; and in a mounting process, the turbulence blocks of the first rotor segment are aligned with those of the second rotor segment; and then the first rotor segment is rotated for 180° to enable the turbulence blocks thereof to be staggered from those of the second rotor segment.

In another embodiment, the first axial through holes of the first rotor segment comprise a first group of first axial through holes and a second group of first axial through holes located on two sides of a diameter and are symmetrical relative to the diameter, wherein the first and second cooling inner walls of the first group of first axial through holes comprise N turbulence blocks, and the first and second cooling inner walls of the second group of first axial through holes comprise (N−i) turbulence blocks; the second axial through holes of the second rotor segment comprise a third group of second axial through holes and a fourth group of second axial through holes located on two sides of a diameter and are symmetrical relative to the diameter, wherein first and second cooling inner walls of the third group of second axial through holes comprise N turbulence blocks, and first and second cooling inner walls of the fourth group of second axial through holes comprise (N−i) turbulence blocks; and in a mounting process, the first rotor segment is rotated coaxially such that the first group of first axial through holes of the first rotor segment are aligned with the fourth group of second axial through holes to form the axial cooling passages, such that the N turbulence blocks and the (N−i) turbulence blocks are adjacent to and staggered from each other in the axial direction of the axial cooling passages.

According to another aspect of the present application, a motor cooling system is provided. The motor cooling system comprises: a first end cap located at a first end of a motor, a first coolant pipeline being formed on the first end cap; a coolant inlet located at the first end of the motor and connected with the first coolant pipeline; a second end cap located at a second end of the motor, a second coolant pipeline being formed on the second end cap; and a plurality of axial cooling passages located in a rotor body of the motor, between the first end cap and the second end cap, and are in fluid communication with the first coolant pipeline and the second coolant pipeline. The rotor body is formed by superposing first rotor segments and second rotor segments; the axial cooling passages are formed by first axial through holes in the first rotor segments and first axial through holes in the second rotor segments, wherein inner walls of the axial cooling passages comprise a plurality of protruding turbulence blocks; the plurality of turbulence blocks comprise a first group of turbulence blocks distributed circumferentially to form a first row and a second group of turbulence blocks; distributed circumferentially to form a second row the first row and the second row are adjacent in the axial direction, and the first group of turbulence blocks and the second group of turbulence blocks are staggered in an axial direction.

In one embodiment, the rotor body comprises at least one first rotor segment and one second rotor segment formed by stacking a plurality of laminates; the first rotor segment comprises a plurality of first axial through holes; the second rotor segment comprises a plurality of second axial through holes; and the plurality of first axial through holes and second axial through holes are aligned to form the plurality of axial cooling passages; and the first group of turbulence blocks with first gaps are formed in the first axial through holes; the second group of turbulence blocks with second gaps are formed in the second axial through holes; and when the rotor is formed, the first segment is rotated coaxially relative to the second segment such that the turbulence blocks in the first axial through holes are aligned with the second gaps in the second axial through holes and the turbulence blocks in the second axial through holes are aligned with the first gaps in the first axial through holes.

In another embodiment, the plurality of turbulence blocks are distributed along an entire length of the axial direction of the rotor; and in the axial direction, two adjacent groups of turbulence blocks are staggered and are not aligned.

In another embodiment, the first coolant pipeline comprises a first group of radial passages and a second group of radial passages, wherein outlets of the first group of radial passages face a stator of the motor so as to transfer coolant to the stator; and the second group of radial passages are in communication with the plurality of axial cooling passages to transfer the coolant; and the second coolant pipeline comprises a third group of radial passages, wherein outlets of the third group of radial passages face the stator of the motor to transfer the coolant to the stator.

In another embodiment, the motor cooling system further comprises a housing for accommodating the motor and a coolant outlet located on the housing, wherein the coolant flows into the system through the coolant inlet on a rotor shaft, flows to the stator and the plurality of axial cooling passages respectively through the first coolant pipeline, further enters the second coolant pipeline through the plurality of axial cooling passages and flows to the stator and the coolant outlet; and the coolant flowing to the stator through the first coolant pipeline and the coolant flowing to the stator through the second coolant pipeline flow to the outside of the motor through the coolant outlet and is further circulated to the coolant inlet.

In another embodiment, the first coolant pipeline comprises an annular distribution passage, and the annular distribution passage is in communication with the axial cooling passages and the first group of radial passages, such that a part of a fluid from the coolant inlet flows through the axial cooling passages and the other part flows to the stator through the first group of radial passages.

In another embodiment, the annular distribution passage comprises an inner annular passage close to the coolant inlet and an outer annular passage away from the coolant inlet; the first group of radial passages comprise a first group of distribution pipes in communication with the coolant inlet and the inner annular passage, and a second group of distribution pipes in communication with the inner annular passage and the outer annular passage, wherein the outer annular passage is in communication with the axial fluid passages and the first group of radial passages.

In another embodiment, the annular distribution passage is configured as an annular groove formed on the first end cap; the second group of radial distribution pipes are configured as radial grooves formed on the first end cap; and the first group of radial distribution pipes are configured as through holes formed at the first end cap, extending radially and in communication with the outer annular passage and the periphery of the first end cap.

According to yet another aspect of the present application, a method for forming a cooling pipe in a motor rotor is provided. The method comprises: providing first rotor segments and second rotor segments with the same structure, wherein the first rotor segment comprises a plurality of first axial through holes and a plurality of first turbulence blocks spaced apart by first gaps in the first axial through holes, and the second rotor segment comprises a plurality of second axial through holes and a plurality of second turbulence blocks spaced apart by second gaps in the second axial through holes; and coaxially rotating the first rotor segments to a predetermined angle such that the first axial through holes and the second axial through holes are aligned to form axial cooling passages, and such that the first turbulence blocks in the first axial through holes and the second turbulence blocks in the second axial through holes are staggered.

In one embodiment, the method further comprises, before coaxially rotating the first rotor segment to a predetermined angle, coaxially rotating the first rotor segments first such that the first axial through holes and the second axial through holes are aligned to form axial cooling passages and such that the first turbulence blocks in the first axial through holes are aligned with the second turbulence blocks in the second axial through holes.

In another embodiment, the the rotor comprises at least one pair of first open slot and second open slot for accommodating at least one pair of magnets and are generally in V shape in cross section; the axial cooling passage is provided with a first cooling inner wall essentially in parallel with the first open slot, a second cooling inner wall essentially in parallel with the second open slot, and a third cooling inner wall connecting the first cooling inner wall and the second cooling inner wall.

In still another embodiment, the method comprises providing a plurality of same-structure laminates having a plurality of axial openings, and stacking the plurality of laminates to form the first rotor segments and the second rotor segments; the axial openings of the laminates comprise a plurality of protrusions; after being stacked, the axial openings form the first axial through holes of the first rotor segments and the second axial through holes of the second rotor segments; and the protrusions are stacked to form the first turbulence blocks and the second turbulence blocks.

The inventor of the present application has recognized that the motor cooling system provided in the prior art still has the following problems: complex structure and room for improvement for both forming process and cooling effect. Therefore, it is hoped that by providing an improved cooling system, one or more problems in the prior art may be resolved.

The above and other advantages and features of the present application will become apparent by referring to the following detailed description of embodiments only or in combination with the accompanying drawings.

For a more complete understanding of embodiments of the present application, reference should be made to more detailed illustration for the accompanying drawings and embodiments described below through examples, wherein

DETAILED DESCRIPTION

Figure 1:
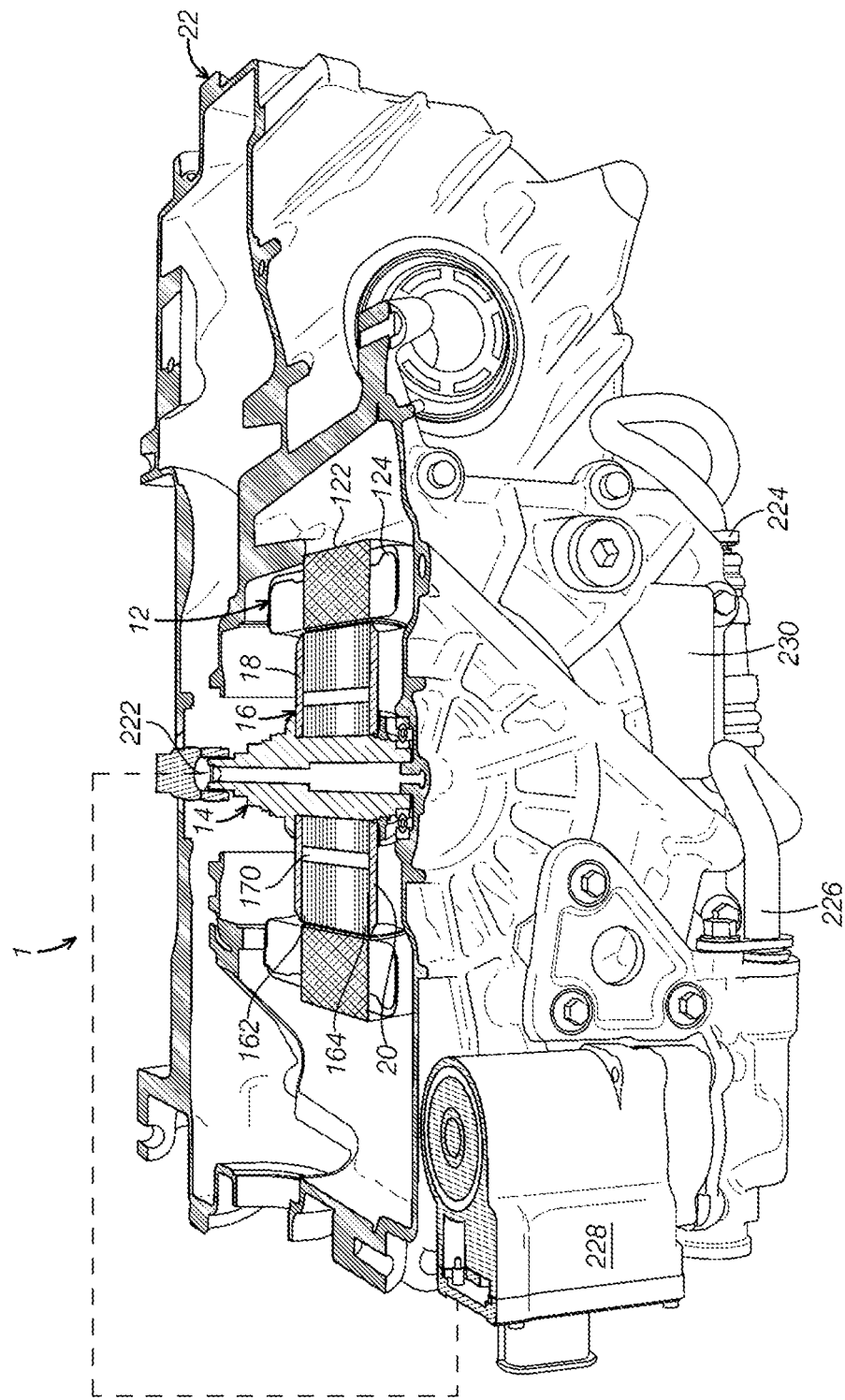
FIG. 1 is a cross-sectional schematic diagram of a motor according to an embodiment of the present application.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

For reference numerals in the drawings, the same or similar reference numerals are used to indicate the same or similar components. In the description below, multiple operation parameters and components are described in multiple embodiments. These specific parameters and components are included herein as examples only and are not meant to be limiting.

Specific embodiments of the present application are disclosed in this description as needed; however, it should be understood that the disclosed embodiments are only examples of the present application and may be implemented in various alternative forms. The drawings do not need to be drawn to scale; some features may be enlarged or shrunk to display details of specific components. Therefore, the specific structures and functional details disclosed herein should not be construed as limiting, but represents a basis for teaching those skilled in the art to implement the present application in many forms.

As mentioned in the background art, in order to improve the performance of the existing permanent magnet motors, cooling systems can be provided for rotors and stators respectively. For example, in the existing solution, a coolant may be guided from a rotor shaft and finish cooling the rotor through a cooling pipe in a rotor core; and the coolant may be supplied to a stator core through another system. However, the inventor of the present application notices that one or more problems exist in the prior art. For example, in some cases, the cooling effect of the rotor core is limited, and cooling the stator winding fulling is difficult to achieve, which leads to a less desired cooling efficiency of the cooling system. One problem of arranging turbulence blocks in the cooling passage is its high cost. The inventor of the present application notices such a problem and therefore provides a cooling system having laminated turbulence blocks and end caps. The staggered turbulence blocks create turbulence on the inner surfaces of the cooling passage, which in turn improves heat transfer efficiency and reduces the working temperature of the magnets. The end caps can be used to provide a cooling fluid for the rotor and the stator windings. A rotor shaft, end caps, and stator core form an integral fluid cooling system. The cooling fluid enters from one end of the rotor shaft and then enters the end-cap cooling pipeline. The fluid is dispersed into each cooling hole of the rotor core. At the same time, part of the cooling fluid is ejected from the edge of the end cap to cool the stator windings. The cooling pipelines of the end caps and the turbulence blocks provide a better cooling effect. The end cap is designed to provide an appropriate amount of coolant for different coolant pipelines/passages and for the stator, too. The turbulence blocks in the cooling passages of the rotor provide higher cooling efficiency for the rotor; the cooling fluid ejected from the edge of the end cap toward the stator windings can better cool the stator windings.

FIG. 1 illustrates a cross-sectional schematic diagram of a motor system 1 according to one embodiment of the present application. As shown in the figure, in one or a plurality of embodiments, the motor system 1 comprises a motor 10 and a housing 22. The motor 10 may comprise an essentially hollow cylindrical stator part 12 and a rotor part 16 supported on a rotor shaft 14 and rotating relative to the stator 12. The stator part 12 further comprises a stator body part 122 and a stator winding 124 illustrated in the figure. In addition, a first end cap 18 at a first end 162 of the rotor 16 and a second end cap 20 at a second end 164 of the rotor are provided in this embodiment. In this embodiment, the motor 10 is positioned within the motor housing 22; The housing 22 may further accommodate other components. One skilled in the art can understand that, in other embodiments, the housing 22 may only accommodate the motor 10. Please continue to refer to FIG. 1. The motor system 1 or the cooling system of the motor may comprise a cooling fluid inlet 222, an axial cooling passage 170, a cooling fluid outlet 224, and a circulating pipeline 226 extending from the fluid outlet 224 to a pump 228. In the circulation of the cooling fluid mentioned above, one or a plurality of pumps 228 may be provided therein to facilitate the pumping of the fluid and auxiliary pumping. For example, the pump 228 illustrated in FIG. 1 is located outside the housing 22 and connected with the circulating pipeline 226. The cooling fluid may flow from the inlet 222 of the housing 22, pass through the rotor 16 and the stator 12, and is discharged through the cooling fluid outlet 224 on the housing 22. The cooling fluid pumped out from the pump 228 may undergo heat exchange outside the housing; and then the cooling fluid may further return back to the motor through the fluid inlet 222. The circulation and cooling of the cooling fluid outside the motor 10 may be done in any appropriate ways. For simplicity purposes, details will not be discussed herein. A fluid circulation process within the motor will be further described below in combination with the drawings.

Figure 2:
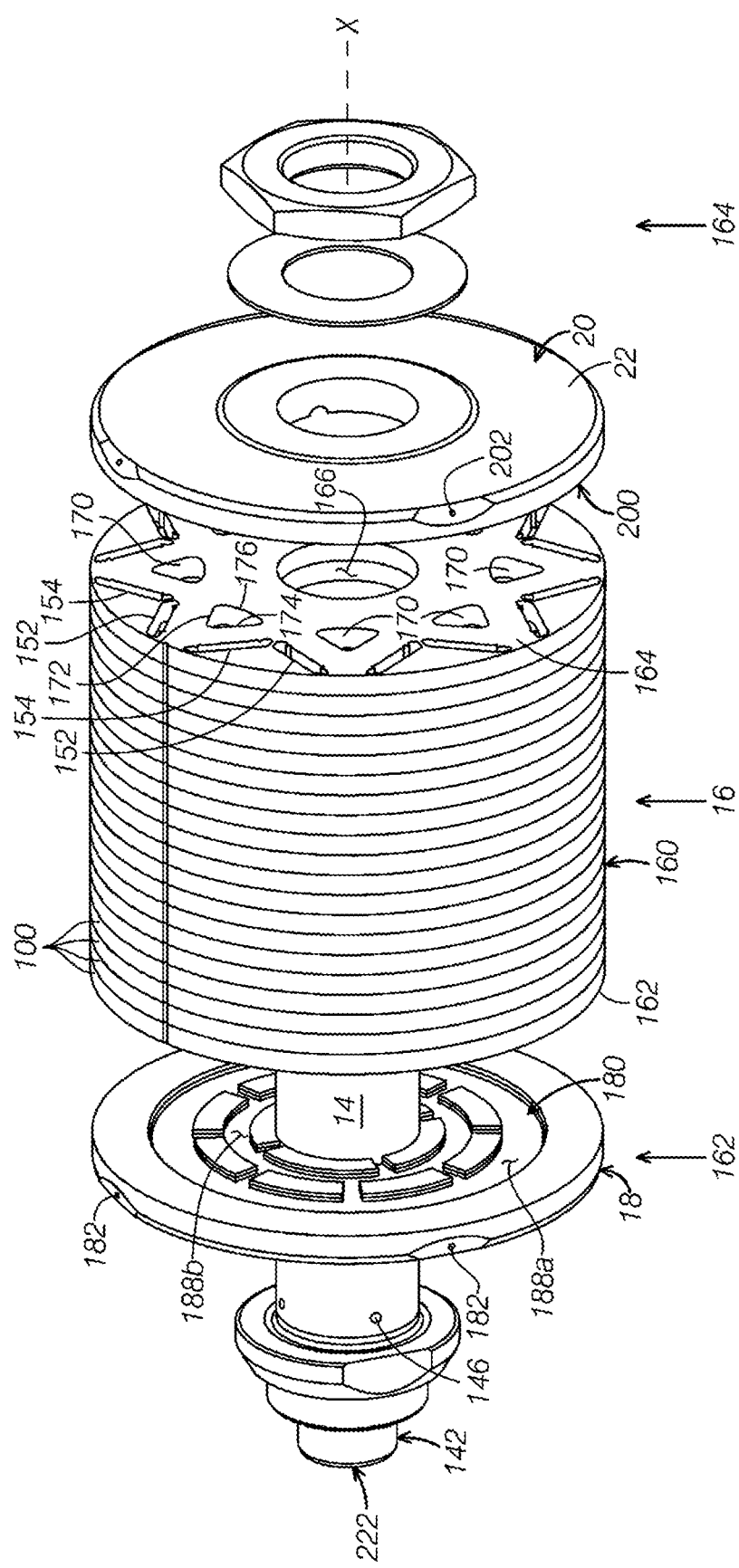
FIG. 2 is an exploded view of a rotor according to an embodiment of the present application.
Figure 3:
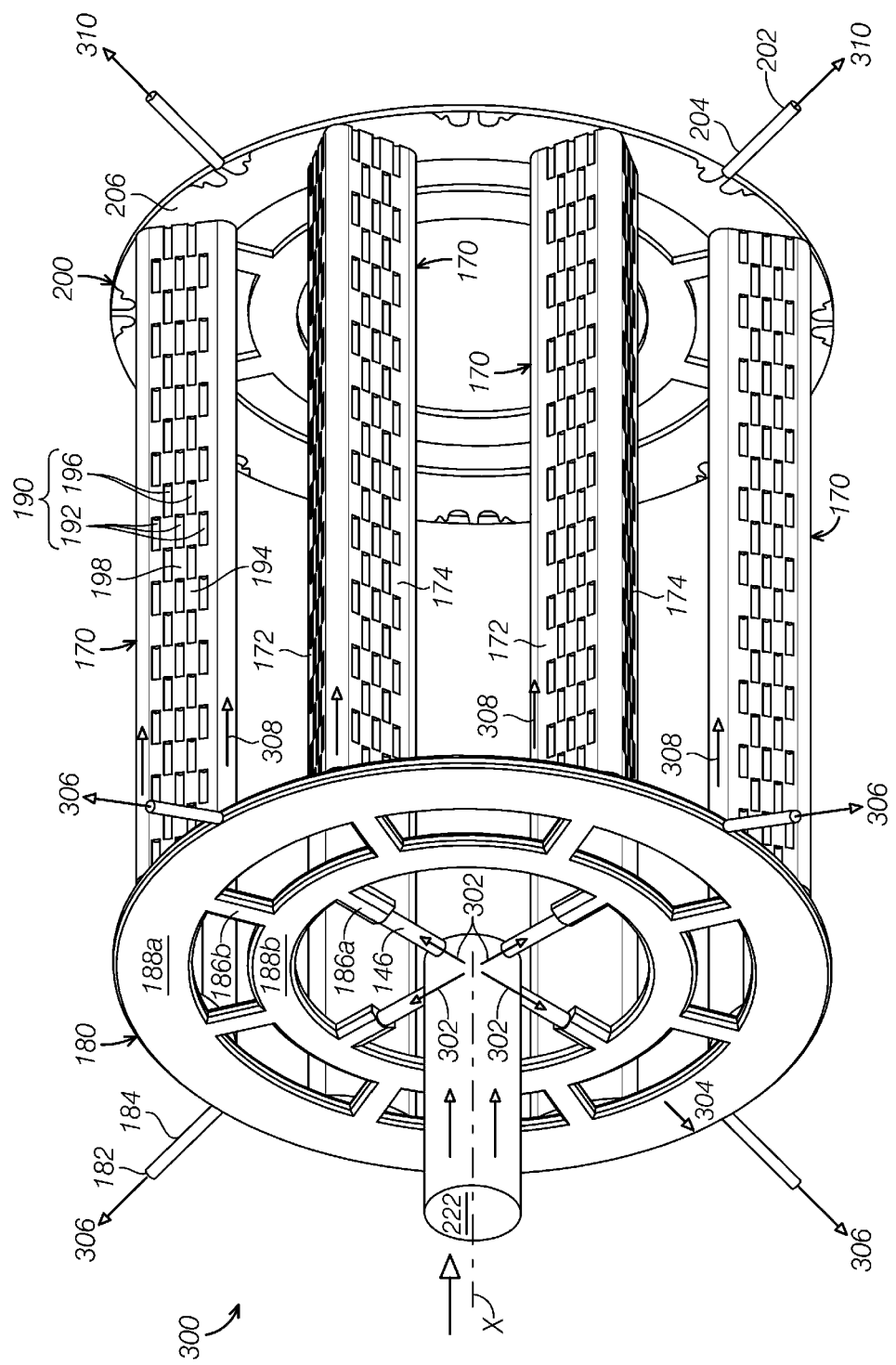
FIG. 3 is a diagram of a virtual cooling system after the rotor according to the embodiment of FIG. 2 is hidden.

With reference to FIGS. 2 and 3, FIG. 2 illustrates a structural schematic diagram of the rotor 16 in embodiment 1; and FIG. 3 illustrates a hypothesized cooling system 300 after the rotor body part 160, the first end cap 18, and the second end cap 20 in the embodiment illustrated in FIG. 2 are hidden, so as to describe its internal structure more clearly. In the embodiment illustrated in the figures, the rotor 16 comprises a body part 160 formed by a plurality of layers of electromagnetic steel sheet laminates 100, and a rotor shaft 14 supporting the body part 160 during rotation. Together with the illustration of FIG. 1, a first end cap 18 is provided at the first end 162 of the rotor 16, and a second end cap 20 is provided at the second end 164. The first end cap 18 is fixed relative to the rotor shaft 14, and rotates synchronously with the body part 160 of the rotor 16. The second end cap 20 is also fixed relative to the body part 160 of the rotor 16 and rotates synchronously therewith. One end 142 of the rotor shaft 14 (for example, the end close to the first end 162 of the rotor in the figure) comprises a coolant inlet 222; and a plurality of openings 146 are arranged in a circumferential direction of the one end 142, close to the coolant inlet 222, of the rotor shaft 14. A first coolant pipeline 180 is formed at the first end cap 18. A plurality of openings 146 are in fluid communication with the first coolant pipeline 180 such that the cooling fluid flowing into the rotor shaft 14 can flow into the first coolant pipeline 180 through the plurality of openings 146.

In the described embodiment, the first coolant pipeline 180 comprises an open slot formed at the first end cap 18 and a plurality of openings 182 facing the stator and located at the periphery of the first end cap 18. The openings 182 face the stator or or stator winding in order to facilitate the transfer of the fluid to the surrounding stator and stator winding (the stator 12, the stator body part 1 and the stator winding 124 are illustrated in FIG. 1). When the first end cap 18 is mounted on the rotor body part 160, the open slot in the first end cap 18 and an end surface of the rotor body part 160 can form the first coolant pipeline 180. On the one hand, the first coolant pipeline 180 can distribute part of the cooling fluid from the fluid inlet 222 to the periphery of the first end cap 18 through the openings 182 under the effect of the centrifugal force of the rotor during rotation; and the coolant is transferred to the stator 12 through the periphery openings 182 of the first end cap for cooling the stator 12. On the other hand, the first coolant pipeline 180 further transfers the cooling fluid to a plurality of axial cooling passages 170 of the rotor body part 160. The second end cap 20 comprises a second coolant pipeline 200; and the second coolant pipeline 200 may have a structure similar to that of the first coolant pipeline 180 and comprises openings 202 facing the stator 12.

As shown in FIG. 2, a through hole 166 is formed in the rotor body part 160 for the rotor shaft 14 to pass therethrough, and a plurality of axial cooling passages 170 are also formed. The axial cooling passages 170 are located in the rotor body part 160 of the motor 10 and extend along an axial direction X, and are generally located between the first end cap 18 and the second end cap 20. The axial cooling passages 170 are in fluid communication with the first coolant pipeline 180 and the second coolant pipeline 200. As described above, the first coolant pipeline 180 transfers the cooling fluid into the axial cooling passages 170 of the rotor body part 160; the fluid flowing into the axial cooling passages 170 further flows into the second coolant pipeline 200 of the second end cap 20. The openings 202, located at the periphery of the second end cap 20 and facing the stator, of the second coolant pipeline 200 can be further used to transfer the coolant to the stator 12. With the rotation of the rotor 16, under the effect of the centrifugal force, the fluid flows through the rotor body part 160, then enters the second coolant pipeline 200 in the second end cap 20, and is further ejected to the stator 12, specifically to the stator winding for cooling the stator winding. Please further refer to FIG. 1. In some embodiments, the fluid flowing from the openings 182 of the first coolant pipeline 180 to the stator and the cooling fluid flowing from the openings 202 of the second coolant pipeline 200 to the stator 12 are collected in the housing 22; for example, the fluid and the cooling fluid may be deposited in an oil pan 230 at the bottom of the housing 22, and then be transferred back to the cooling fluid inlet 222 of the motor 10 through an external circulating cooling pipeline (for example, pipeline 226 in FIG. 1).

The rotor body part 160 comprises first open slots 152 and second open slots 154 for a plurality of pairs of first magnets 430 and second magnets 432 to be embedded therein. In the cross section perpendicular to the central axis X of the rotor 16, the first open slots 152 and the second open slots 154 generally form a V shape. After assembly, the magnets also form a V shape. One skilled in the art generally refer this configuration as a V-shaped configuration. The magnets may certainly be disposed in other shapes, such as a triangular shape, which the solution of the present application may still be applied thereto without departing from the spirit and essence of the present application. In the described embodiment, the plurality of axial cooling passages 170 may have a roughly triangular cross section. Taking one axial cooling passage 170 as an example, the axial cooling passage 170 may comprise a first cooling inner wall 172 adjacent to the first magnet 430/or the first open slot 152, a second cooling inner wall 174 adjacent to the second magnet 432/the second open slot 154, and a third cooling inner wall 176 connecting the first cooling inner wall 172 and the second cooling inner wall 174. In one embodiment, the first cooling inner wall 172 of the axial cooling passage 170 is essentially in parallel with the first magnet 430 or the first open slot 152, and the second cooling inner wall 174 is essentially in parallel with the second magnet 432 or the second open slot 154, so as to provide an optimized and balanced cooling effect.

With reference to FIGS. 2 and 3, in one or a plurality of embodiments, the cooling system 300 comprises the coolant inlet 222 formed in the rotor shaft 14, the first coolant pipeline 180 in communication with the coolant inlet 222, the plurality of axial cooling passages 170, and the second coolant pipeline 200; and the flow direction of the cooling fluid is as illustrated by the arrows. First, as illustrated by arrow 302, the fluid flows into the first coolant pipeline 180 from the rotor shaft 14 through the openings 146 in the rotor shaft 14 illustrated in FIG. 2. At this moment, the fluid flowing into the rotor shaft 14 flows directly into the first coolant pipeline 180 without further flowing into the rotor shaft or the other end of the rotor shaft. Then, as illustrated by arrow 304, one part of the cooling fluid, through the first coolant pipeline 180, is distributed to the outlet 182 facing the stator and flows to the stator 12 as illustrated by arrow 306. The other part of the fluid from the first coolant pipeline 180, as illustrated by arrows 308, flows from the first coolant pipeline 180 to the plurality of axial cooling passages 170. After that, the cooling fluid entering the plurality of axial passages 170 further flows into the second coolant pipeline 200, and are eventually discharged through the openings 202 facing the stator in the circumferential direction of the second coolant pipeline 200, as illustrated by arrow 310. As described above, the cooling of the rotor 16 and the stator 12 can be achieved through one cooling system 300, which improves the use efficiency and cooling effect of the cooling fluid.

In further combination with FIG. 2 and FIG. 3, inner walls of axial cooling passages 170 comprise a plurality of protruding turbulence blocks 190, which will be described below by using one axial cooling passage 170 as an example. One axial cooling passage 170 may at least comprise the first cooling inner wall 172 and the second cooling inner wall 174 described above, wherein a plurality of rows of turbulence blocks 190 may be formed on the first cooling inner wall 172 and the second cooling inner wall 174; and two adjacent rows of turbulence blocks 190 are staggered from each other. That is to say, the two adjacent rows of turbulence blocks 190 are not aligned in the axial direction. For example, a first group of turbulence blocks 192 at a first row are circumferentially distributed and formed on the first cooling inner wall; the first group of turbulence blocks 192 may have first gaps 194 provided therebetween; a second group of turbulence blocks 192 at a second row are circumferentially distributed and formed; the second group of turbulence blocks 192 may have second gaps 198 provided therebetween; the first row of turbulence blocks 192 and the second row of turbulence blocks 196 are adjacent in the axial direction; and the first group of turbulence blocks 192 and the second group of turbulence blocks 196 are staggered in the axial direction X. In other words, the first group of turbulence blocks 192 at the first row correspond to, in the axial direction, the second gaps 198 formed among the turbulence blocks 196 at the second row. Accordingly, the plurality of first gaps 194 of the first row of turbulence blocks 192 correspond to the turbulence blocks 196 at the second row. In the described embodiment, the plurality of turbulence blocks 192 and 196 are uniformly distributed along the entire length of the axial direction X of the rotor; and in the axial direction, any two adjacent groups of turbulence blocks are staggered and are not aligned.

Please continue to refer to FIG. 3 in combination with FIG. 1 and FIG. 2. In one or a plurality of embodiments, the first coolant pipeline 180 comprises a first group of radial passages 184 and a second group of radial passages 186 distributed in the radial direction; the outlets of the first groups of radial passages 184 are the aforementioned openings 182, which face the stator 12 of the motor 10 for transferring the coolant to the stator 12. The first group of radial passages 184 and the second group of radial passages 186 are in communication with the plurality of axial cooling passages 170 to transfer the coolant.

As shown in FIG. 3, the second coolant pipeline 200 comprises a third group of radial passages 204, and outlets 202 of the third group of radial passages 204 face the stator 12 of the motor 10 to facilitate the transferring of the coolant to the stator 12. It can be further seen that the first coolant pipeline 180 further comprises an annular distribution passage 188, and the annular distribution passage 188 is in communication with the axial cooling passages 170 and the first group of radial passages 184, such that a part of a fluid from the coolant inlet 222 flows through the axial cooling passages 170 and the other part flows to the stator 12 through the first group of radial passages 184. In one or a plurality of embodiments, the first group of radial passages 184 and the openings 182 are sized to allow the fluid to be ejected to the winding of the motor stator through the first group of radial passages 184. The openings 182 may be sized to allow an appropriate amount of fluid to be ejected to the stator at a certain flow rate, and the rest enters the axial cooling passages 170. The fluid ejected to the stator improves the cooling efficiency; the integrated system therefore does not need a separate cooling system in the stator.

In a further embodiment, the annular distribution passage 188 comprises an inner annular passage 188b close to the coolant inlet 222 and an outer annular passage 188a away from the coolant inlet 222. The second group of radial passages 186 comprises a first group of distribution pipes 186a in communication with the coolant inlet 222 and the inner annular passage 188b, and a second group of distribution pipes 186b in communication with the inner annular passage 188b and the outer annular passage 188a. The fluid enters the inner annular passage 188b in the radial direction through the first group of distribution pipes 186a, and further enters the outer annular passage 188a through the second group of distribution pipes 186b. The fluid entering the outer annular passage 188a is further supplied to the stator through the first group of radial passages 184. One skilled in the art can understand that the first coolant pipeline 180 may comprise fewer or more radial distribution pipes and annular distribution pipes.

Please further refer to FIG. 3 in combination with FIG. 1 and FIG. 2. In one or a plurality of embodiments, the aforementioned annular passage 188 (e.g., 188a and 188b above) is configured as an annular groove formed on the inner surface of the first end cap 18; and the first group of distribution pipes 186a and the second group of distribution pipes 186b are configured as a plurality of emitting grooves. extending radially, formed on the inner surface of the first end cap 18 (i.e., close to the rotor body part 160 during assembly). The first group of radial passages 184 are configured as through holes 184 formed on the first end cap 18, extending radially and in communication with the outer annular passage 188a and the openings 182 in the outer circumference of the first end cap. The through holes 184 and the openings 182 are sized to allow an appropriate amount of fluid to pass therethrough. In one embodiment, the number of the openings 182 and the first group of radial passages 184 is smaller than the number of the axial passages 170; and the cross-sectional size of each opening 182 and the first group of radial passages 184 is smaller than the size of each axial passage 170. In one embodiment, the number of the openings 182 and the first group of radial passages 184 is four, uniformly distributed in the first end cap 18; the number of the first group of distribution pipes 186a is four, which are uniformly distributed. The number of the second group of distribution pipes 186b is eight, which are staggered from the first group of distribution pipes 186*a* in the radial direction in order to achieve more balanced fluid distribution.

In one or a plurality of embodiments, the inner and outer annular passages 188*a* and 188*b* may also be formed as a whole, or more than two annular passages may be designed. One skilled in the art can make variations based on needs. Generally speaking, the first coolant pipeline 180 may comprise grooves or through holes formed in the first end cap 18. Likewise, the second coolant pipeline 200 may comprise grooves or through holes formed in the second end cap 20; and the plurality of axial cooling passages 170 are formed as through holes extending axially in the rotor body part. When the assembly of the rotor is completed, the grooves or through holes formed in the first end cap 18 and the second end cap 20, and the end surface of the rotor body part 160 together form the relatively closed first coolant pipeline 180 and second coolant pipeline 200. In one embodiment, the second coolant pipeline 200 may have a more concise structure than the first coolant pipeline 180, provided that the second coolant pipeline 200 has a third group of radial passages 204 that guide the coolant in the axial cooling passages 170 to the periphery of the second end cap 20. In the described embodiment, the second coolant pipeline 200 further comprises a third annular passage 206 in fluid communication with the axial cooling passages 170. The third annular passage 206 is further in communication with the third group of radial passages 204. The fluid from the axial cooling passages 170 can enter the third annular passage 206 and is further ejected, through the third group of radial passages 204, to the other end of the stator 12 with the rotation and under the effect of the centrifugal force. The cooling fluid flowing to the stator 12 eventually gathers in the housing 22 and circulates through the corresponding circulating pipeline.

Figure 4A:
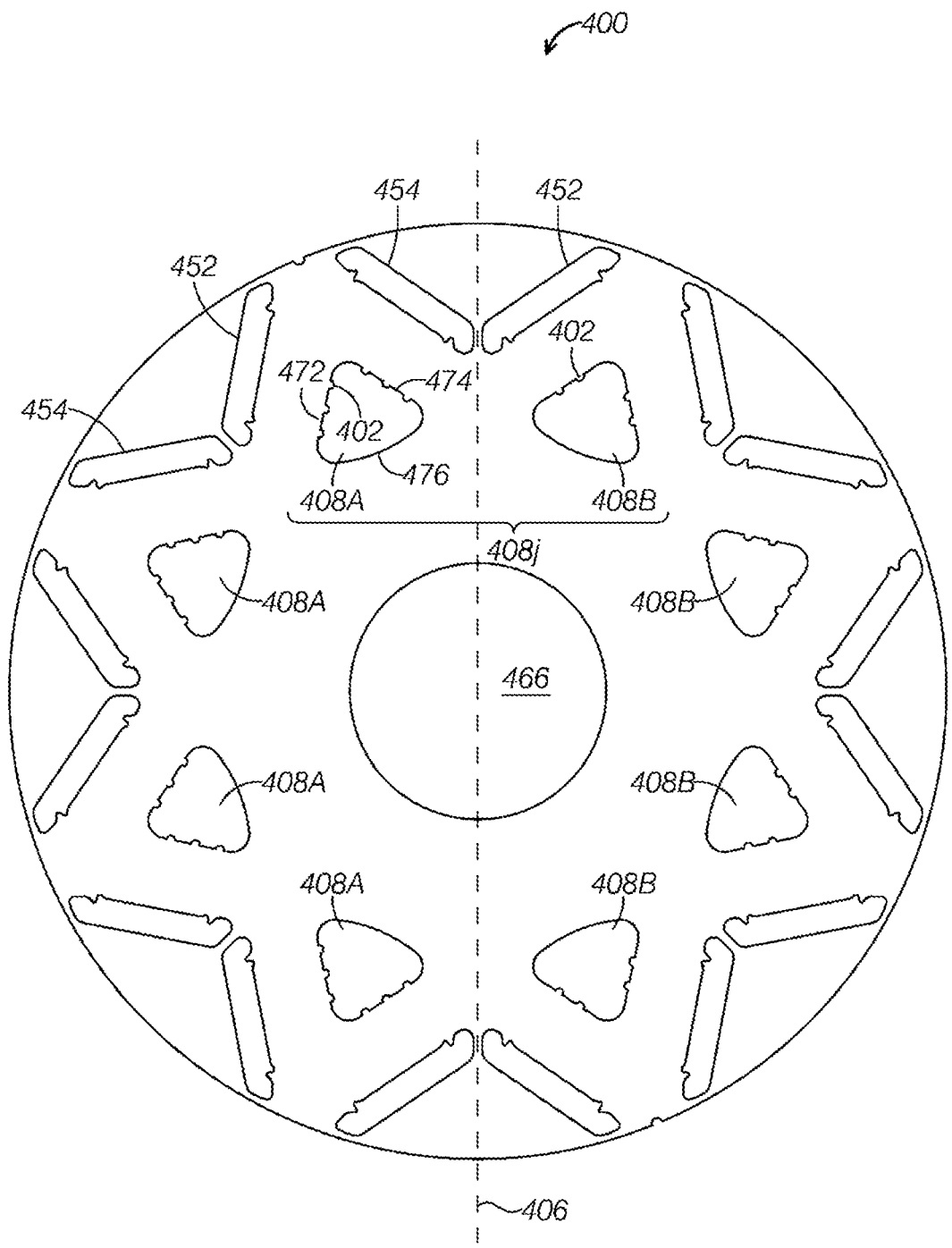
FIG. 4A is a top schematic diagram of a laminate for forming a rotor body according to an embodiment of the present application.
Figure 4B:
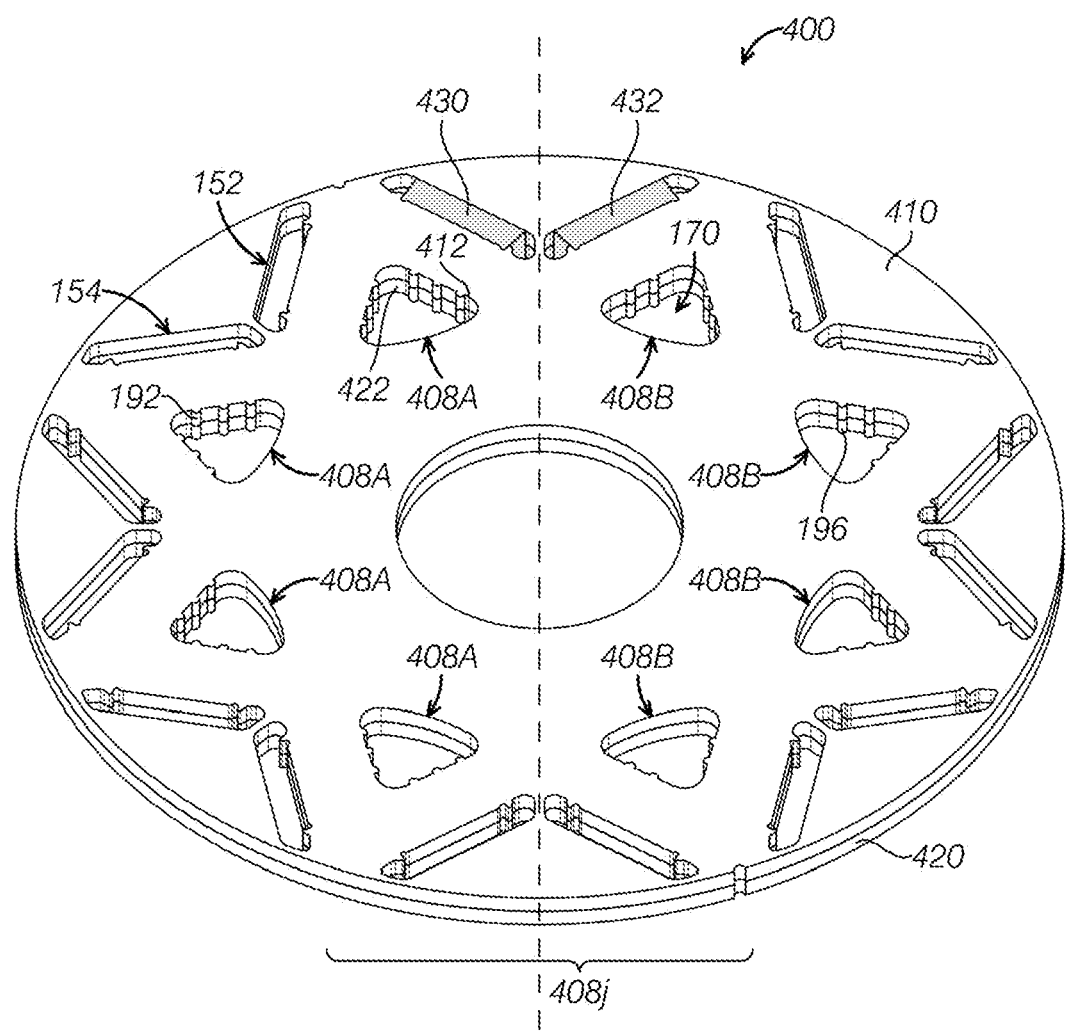
FIG. 4B is an exploded view of a first rotor segment and a second rotor segment in a rotor-forming process.
Figure 4C:
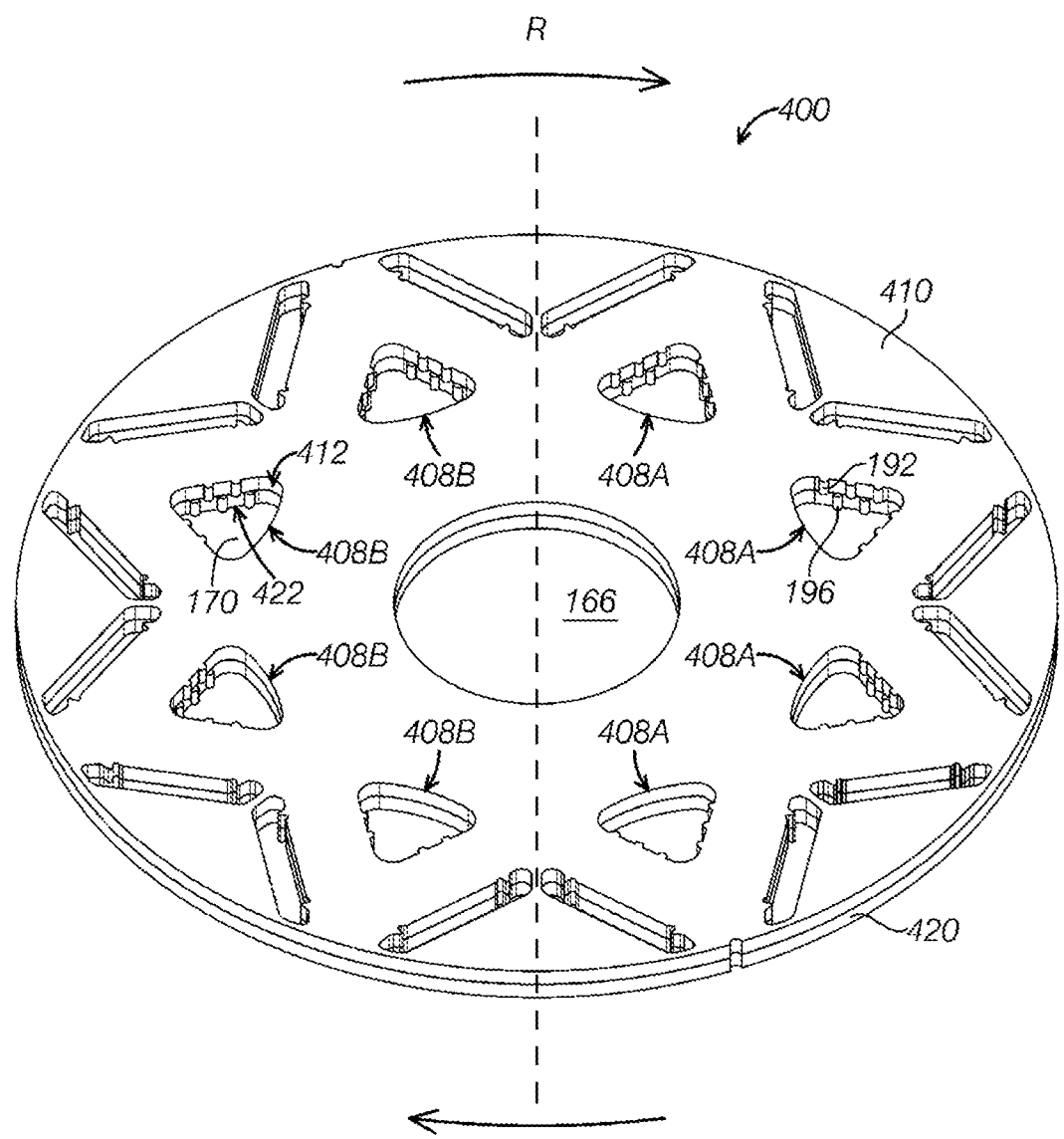
FIG. 4C is an exploded view of the first rotor segment and the second rotor segment after a rotor is formed.

A method for forming a rotor in one embodiment of the present application will be described below with reference to FIGS. 4A, 4B, and 4C. FIG. 4A illustrates a cross-sectional view of a laminate 400 used for producing a rotor according to one embodiment of the present application. FIG. 4B is a schematic diagram showing a process for forming a first rotor segment 410 and a second rotor segment 420 by superposing laminates. FIG. 4C is a schematic diagram showing a final rotor segment formed by rotating the rotor segments in FIG. 4B relative to reach other. In the embodiment of the present application, the body part 160 of the rotor can be formed by superposing a plurality of laminates 400. Each laminate 400 may comprise a through hole 466 for the rotor shaft 14 to pass therethrough, openings 408*j* for forming the plurality of cooling passages 170, and a first open slot 452 and a second open slot 454 for accommodating the first magnet 430 and the second magnet.

After superposing, the first open slot 452 and the second open slot 454 can form the first open slot 152 and the second open slot 154 in the above example. In the illustrated embodiment, the plurality of openings 408*j* for forming the cooling passages 170 are roughly in triangular shape. Each opening 408*j* for forming the axial cooling passage 170 may comprise a first cooling inner wall 472 adjacent to the first magnet 430/or the first open slot 452/152, a second cooling inner wall 474 adjacent to the second magnet 432/the second open slot 452/154, and a third cooling inner wall 476 connecting the first cooling inner wall 472 and the second cooling inner wall 474. In one embodiment, the first cooling inner wall 472 of the opening 408 is essentially in parallel with the first magnet 430 or the first open slot 452, and the second cooling inner wall 474 is essentially in parallel with the second magnet 432 or the second open slot 454, so as to provide an optimized and balanced cooling effect.

Protrusions 402 may be formed on the first cooling inner wall 472 and the second cooling inner wall 474; and the plurality of protrusions 402 may be superposed to form one or the plurality of turbulence blocks 192 on the first rotor segment and one or the plurality of turbulence blocks 196 on the second rotor segment. As illustrated in FIG. 4A, in the described embodiment, the openings 408*j* of the plurality of laminates 400 are aligned in the axial direction by using a boundary line 406 as a base line to form a first group of axial through holes 408A and a second group of axial through holes 408B. All the inner walls of the first group of axial through holes 408A (the inner walls of the axial passage 408A may be formed by superposing the first cooling inner walls 472 and the second cooling inner walls 474 in the axial direction) comprise three protrusions 402; and all the inner walls (the inner walls of the axial passages may be formed by superposing the first cooling inner walls 472 and the second cooling inner walls 474) of the second group of axial passages 408B (those at the right side of the line 406) comprise two protrusions 402. It should be understood that the cross section of the axial through hole may be in other shapes, such as a circular shape or a polygonal shape.

Please continue to refer to FIG. 4B. The laminates 400 illustrated in FIG. 4A can be superposed to respectively form at least the first rotor segment 410 and the second rotor segment 420 illustrated in FIG. 4B. The first rotor segment 410 and the second rotor segment 420 may have an appropriate thickness, i.e., the size in the axial direction. Each rotor segment may be subject to a desired axial size of a turbulence block 402. For example, if a turbulence block having an axial length of 0.5 cm is desired, the length of the rotor segment may be set to 0.5 cm. One skilled in the art may make a selection based on the needs for cooling effect.

As illustrated in FIG. 4B, the first rotor segment 410 and the second rotor segment 420 formed through superposing are aligned because the laminates 400 have the same structure. For the ease of description, the axial through holes formed by the openings 408*j* in the first rotor segment 410 are named as first axial through holes 412 of the first rotor segment 410; and the axial through holes formed by the openings 408*j* in the second rotor segment 410 are named as second axial through holes 422 of the second rotor segment 420. The first axial through holes 412 are aligned with the second axial through holes 422 of the second rotor segment to facilitate the formation of the axial cooling passages 170. The plurality of protrusions 402 in the first rotor segment 410 and the second rotor segment 420 form the plurality of protruding turbulence blocks 192 and 196. Specifically, in combination with FIG. 3, the inner wall of the axial cooling passage 170 comprises a plurality of protruding turbulence blocks. At this time, the turbulence blocks 192 and 196 arranged using the two methods are aligned.

Please continue to refer to FIG. 4C. By rotating the first rotor segment 410 and the second rotor segment 420 relatively to each other, the turbulence blocks in the first axial through holes 412 and the turbulence blocks in the second axial through holes 422 can be staggered in the axial direction. That is to say, the two adjacent rows of turbulence blocks 192 and 196 are staggered. For example, the protruding turbulence blocks 192 at the first row are arranged in accordance with the gaps among the turbulence blocks 196 at the second row; the protruding turbulence blocks 196 at second row, on the other hand, are arranged in accordance with the gaps among the turbulence blocks 192 at the first row. In the present embodiment, the staggered turbulence blocks can be implemented by relatively rotating the first rotor segment 410 and the second rotor segment 420 for 180°.

Please continue to refer to FIGS. 4A, 4B, and 4C. In one embodiment, the first axial through holes 412 of the first rotor segment 410 comprise a first group of first axial through holes 408A and a second group of first axial through holes 408B located on two sides of a diameter 406 and are symmetrical relative to the diameter. The first and second cooling inner walls of the first group of first axial through holes 408A (the first and second cooling inner walls may be formed by aligning and superposing the first cooling inner walls 472 and the second cooling inner walls 474 of a plurality of laminates 400 in the axial direction) comprise N turbulence blocks. The first and second cooling inner walls of the second group of first through holes 408B (the first and second cooling inner walls may be formed by aligning and superposing the first cooling inner walls 472 and the second cooling inner walls 474 of the plurality of laminates 400 in the axial direction) comprise (N−i) turbulence blocks. A number of the first group of first axial through holes 408A is the same as a number of the second group of first axial through holes 408B.

In the illustrated embodiment, the number of the through holes in the first group of first axial through holes 408A is 4; and the number of the through holes in the second group of first axial through holes 408B is 4. In the illustrated embodiment, N is 3 and i is 1. The second axial through holes 422 of the second rotor segment 420 comprise a third group of second axial through holes 408A and a fourth group of second axial through holes 408B located on two sides of the diameter 406 and are symmetrical relative to the diameter; first and second cooling inner walls of the third group of second axial through holes 408A comprise N turbulence blocks; first and second cooling inner walls of the fourth group of second axial through holes 408B comprise (N−i) turbulence blocks; and in a mounting process, the first rotor segment 410 is rotated coaxially such that the first group of first axial through holes 408A of the first rotor segment 410 are aligned with the fourth group of second axial through holes 408B to form the axial cooling passages, such that the N turbulence blocks and the (N−i) turbulence blocks are adjacent to and staggered from each other in the axial direction of the axial cooling passages.

In the above embodiment, the numbers of two adjacent rows of turbulence blocks in the axial direction are different, such that the turbulence blocks can be staggered during arrangement. One skilled in the art can appreciate that the arrangement of the turbulence blocks 192 and 196 may be changed based on the needs; and various methods for forming staggered turbulence blocks may exist when the shapes of the laminates are the same. For example, in some embodiments, two adjacent rows of turbulence blocks may be the same in number; but the arrangements of the two rows of turbulence blocks, or the gaps among the turbulence blocks, are different, such that when the rotor is formed, the effect of misaligned turbulence blocks may still be obtained. One skilled in the art can fully expect other variations.

Figure 5:
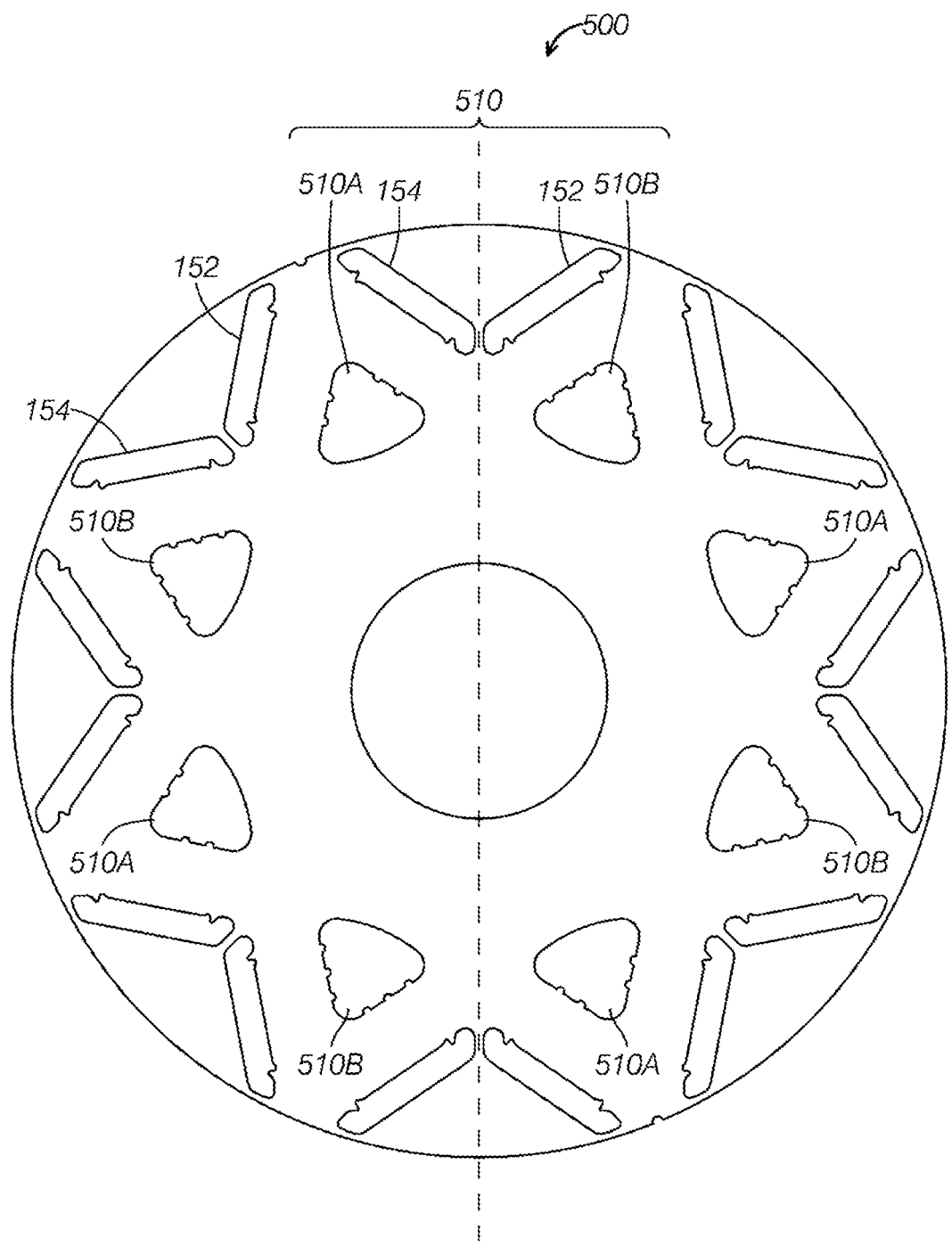
FIG. 5 is a schematic diagram of a laminate for forming a rotor according to another embodiment.

Please continue to refer to FIG. 5. A laminate 500 for forming a rotor according to another embodiment is shown. The method for forming the rotor by using the laminates 500 is similar to that illustrated in FIGS. 4A, 4B, and 4C. Only the differences therebetween are described herein. Please refer to FIG. 5. A plurality of axial passages 510 can be divided into two groups: 510A and 510B. First cooling inner walls 512 and second cooling inner walls 514 of the first group of axial passages 510A comprise (N−i) protrusions, whereas first cooling inner walls 512 and second cooling inner walls 514 of the second group of axial passages 510B comprise N protrusions. In the illustrated embodiment, N is 3 and i is 1. That is to say, the first cooling inner walls 512 and the second cooling inner walls 514 of the first group of axial passages 510A comprise two protrusions; the first cooling inner walls 512 and the second cooling inner walls 514 of the second group of axial passages 510B comprise three protrusions. The first group of axial passages 510A and 510B are spaced from each other, such that when rotating as illustrated in FIG. 4C, only a rotation for a small angle is needed. For example, in this example, the staggered arrangement of the turbulence blocks may be implemented with a rotation for 180°/8 (22.5°). The arrangement of the first group of axial passages 510A and the second group of axial passages 510B may vary in many ways; and the number of the included protrusions may also be increased or decreased according to the needs.

Figure 6:
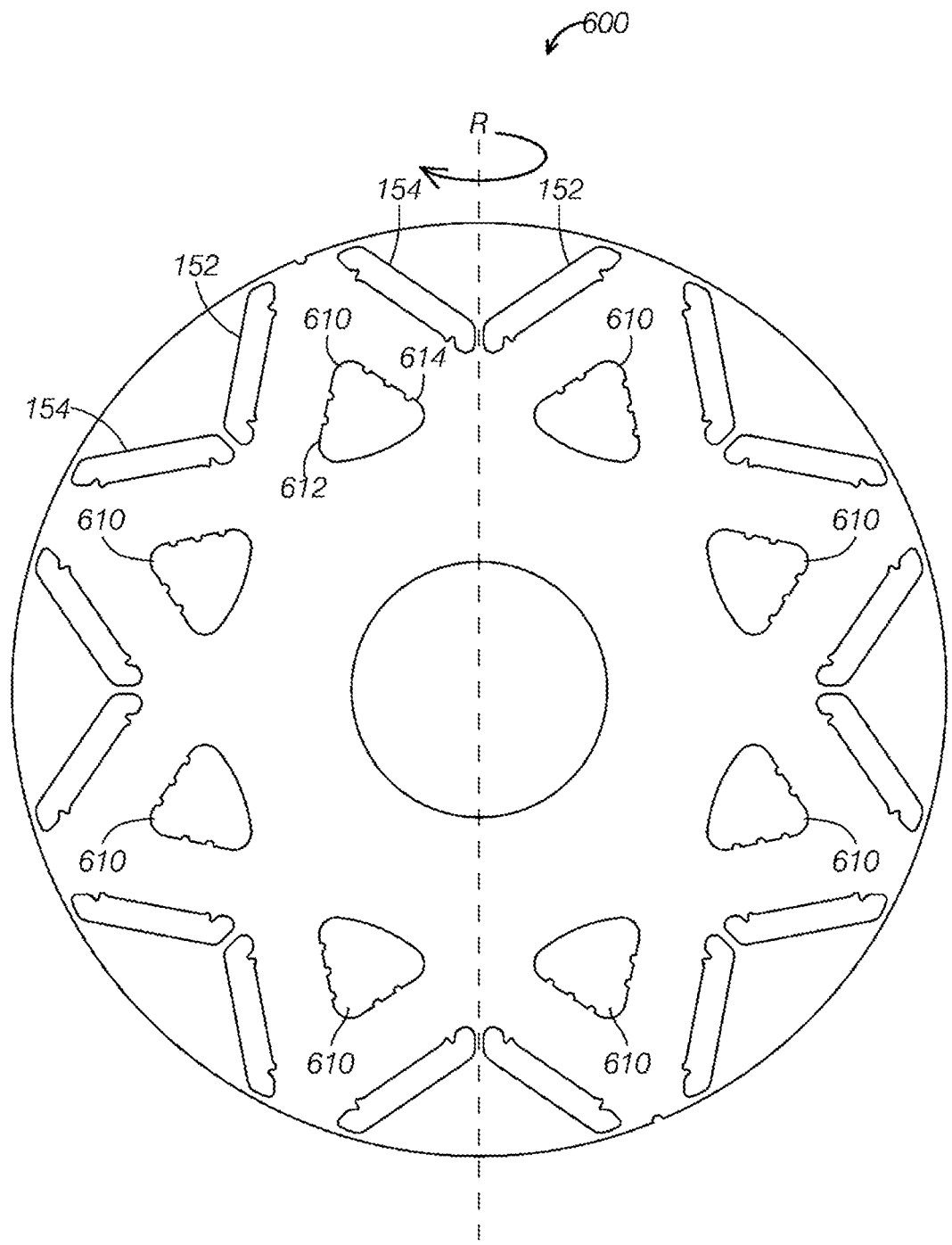
FIG. 6 is a schematic diagram of a laminate for forming a rotor according to still another embodiment.

Please continue to refer to FIG. 6. A laminate 600 for forming a rotor according to another embodiment is shown. A plurality of axial passages 610 in the laminate 600 have the same structure; but the difference therebetween is that a first cooling inner wall 612 and a second cooling inner wall 614 of each passage 610 comprise different numbers of protrusions 602 arranged in different ways. For example, the first cooling inner wall 612 may comprise two protrusions, and the second cooling inner wall 614 may comprise three protrusions. When a plurality of laminates 600 are superposed on each other, a plurality of identical first rotor segments and second rotor segments can be formed. After reversely rotating the second rotor segments along a direction R illustrated in the figure, and then superposing and aligning the two rotor segments, the protrusions in the first cooling inner wall 612 and those in the second cooling inner wall 614 in each axial passage 610 can be staggered, thus forming the staggered turbulence blocks in the axial direction. Similarly, one skilled in the art can appreciate that the number of protrusions included therein may also be increased or decreased according to the needs.

Figure 7:
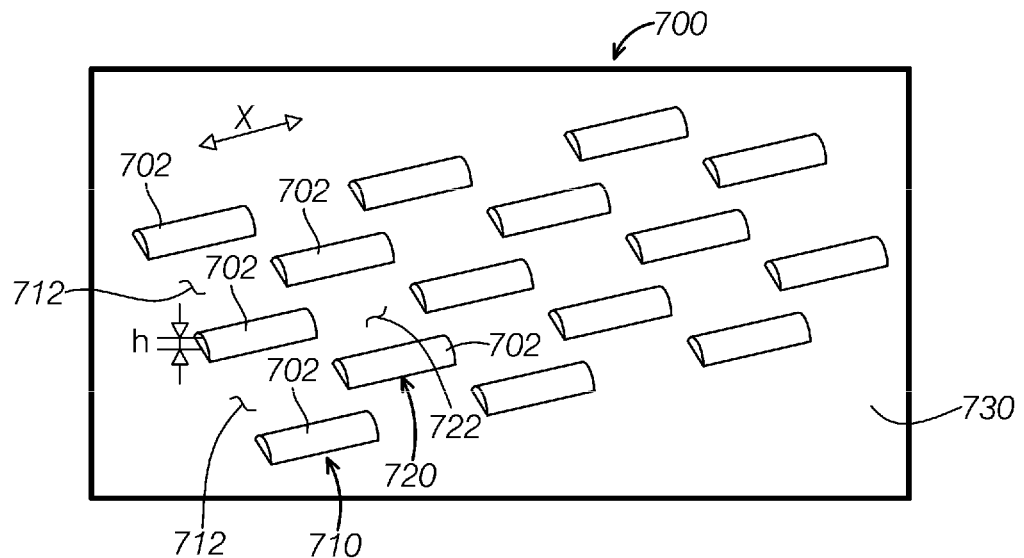
FIG. 7 is a schematic diagram of turbulence blocks in axial cooling passages according to an embodiment.

FIG. 7 illustrates an embodiment of axial cooling passages 700 of a rotor. Please refer to FIG. 7. A plurality of turbulence blocks 702 are arranged in a plurality of rows in the axial direction X. Taking adjacent turbulence blocks 710 at the first row and turbulence blocks 720 at the second row as an example, the number of the turbulence blocks 710 at the first row is 3; first gaps 712 are formed among the three turbulence blocks 702; the adjacent turbulence blocks 720 at the second row in the axial direction has two turbulence blocks 702; a second gap 722 is formed therebetween; the turbulence blocks 702 of the turbulence blocks 710 at the first row in the axial direction are arranged in accordance with/aligned with the gap 722 of the turbulence blocks 120 at the second row; and the first gaps 712 among the turbulence blocks 710 at the first row are arranged in accordance with/aligned with the turbulence blocks 702 in the second row. In this way, the first row and the second row are sequentially arranged in an alternate manner so that the coolant flowing passing one or the plurality of cooling inner walls may generate turbulence and a better cooling effect is then achieved. In the cross section perpendicular to the axial direction X, the turbulence block has an arc or semi-circular cross section. A height h of the turbulence block 702 is the extending length of the turbulence block 702 away from the cooling surface 730. In the illustrated embodiment, each row of turbulence blocks 702 has the same height. In some embodiments, the first and second rows of turbulence blocks 702 may have different heights.

Figure 8:
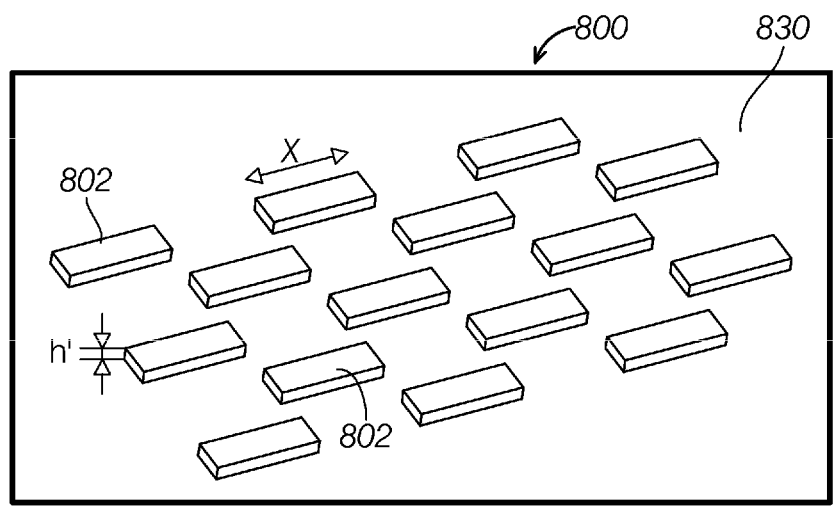
FIG. 8 is a schematic diagram of turbulence blocks in axial cooling passages according to another embodiment.

It can be understood that the turbulence block may be provided with other shapes. FIG. 8 illustrates another rotor having an axial cooling passage 800 according to an embodiment. The turbulence blocks in FIG. 8 and the turbulence blocks in FIG. 7 are arranged in a similar manner. The difference is that the turbulence block 802 has a rectangular cross section in the cross section perpendicular to the axial direction X. One skilled in the art may conceive of other variations. For example, the turbulence blocks may have a triangular, elliptical, rhombic, square, or trapezoidal cross section. In other embodiments, the turbulence blocks may have different heights. A height h of the turbulence block 802 is the extending length of the turbulence block 802 away from the cooling surface 830. In the illustrated embodiment, each row of turbulence blocks 802 has the same height. In some embodiments, the first and second rows of turbulence blocks 802 may have different heights.

Figure 9:
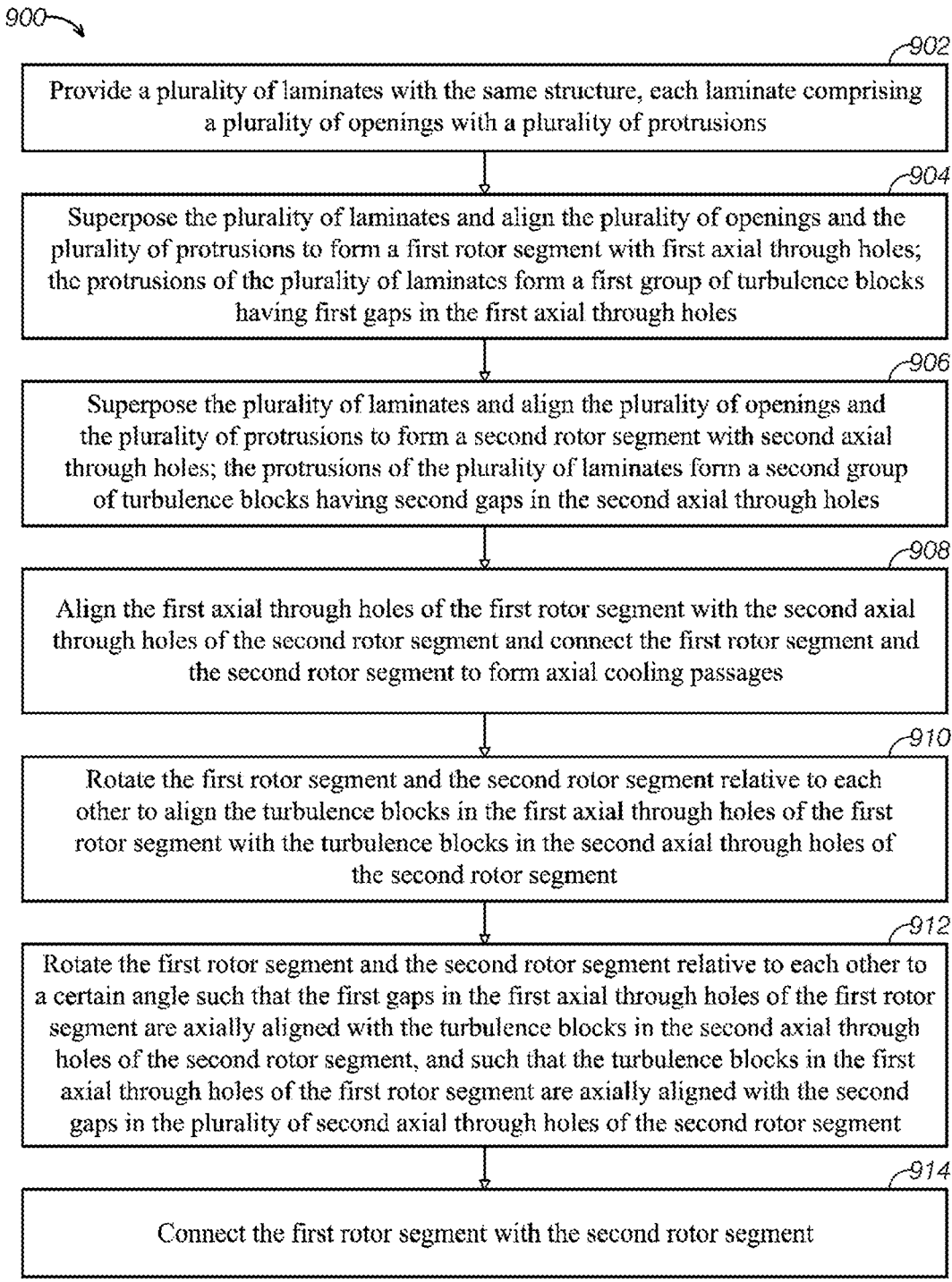
FIG. 9 is a flowchart of a method for forming a rotor according to one embodiment of the present application.

Please continue to refer to FIG. 9. A flowchart showing a method for producing the rotor in the present application is illustrated. As illustrated in the figure, in step 902, the method 600 comprises providing a plurality of laminates with the same structure, each laminate comprising a plurality of openings with a plurality of protrusions. For example, one or a plurality of laminates may be the laminates 400 illustrated in FIG. 4A-4C, or the laminates 500 illustrated in FIG. 5, or the laminates 600 illustrated in FIG. 6. Each laminate is provided with openings for forming axial through holes, such as 408j, 510, and 610. Openings 408j, 510, and 610 comprise a plurality of protrusions.

In step 904, the method 600 comprises superposing the plurality of laminates and aligning the plurality of openings and the plurality of protrusions to form a first rotor segment with first axial through holes; the protrusions of the plurality of laminates form a first group of turbulence blocks having first gaps in the first axial through holes.

In step 906, the method 600 comprises superposing the plurality of laminates and aligning the plurality of openings and the plurality of protrusions to form a second rotor segment with second axial through holes; the protrusions of the plurality of laminates form a second group of turbulence blocks having second gaps in the second axial through holes. A rotor segment with a certain thickness (i.e., a certain length in the axial direction) can be formed by superposing one or a plurality of laminates.

In step 908, the method 600 comprises aligning the first axial through holes of the first rotor segment with the second axial through holes of the second rotor segment and connecting the first rotor segment and the second rotor segment to form axial cooling passages.

In step 910, the method 600 comprises rotating the first rotor segment and the second rotor segment relative to each other to align the turbulence blocks in the first axial through holes of the first rotor segment with the turbulence blocks in the second axial through holes of the second rotor segment.

In step 912, the method 600 comprises rotating the first rotor segment and the second rotor segment relative to each other to a certain angle such that the first gaps in the first axial through holes of the first rotor segment are axially aligned with the turbulence blocks in the second axial through holes of the second rotor segment, and such that the turbulence blocks in the first axial through holes of the first rotor segment can be axially aligned with the second gaps in the plurality of second axial through holes of the second rotor segment.

The first rotor segment and the second rotor segment may be superposed, as illustrated in FIG. 4B. It can be understood that one or more of the above steps can certainly be implemented at the same time or in sequence; or based on the needs, one or more steps can be omitted to achieve the object of the present application. The rotation angle is related to the structure of the turbulence blocks in the rotor segments. For example, in the embodiment illustrated in FIGS. 4A-4C, the first rotor segment and the second rotor segment may be rotated relative to each other for 180°. In the embodiment illustrated in FIG. 5, the rotating angle is relative small. Or it can be further illustrated as is the case in FIG. 6 where the second rotor segment may be flipped before being superposed on the first rotor segment. The first gaps in the first axial through holes of the first rotor segment can be aligned with the turbulence blocks in the second axial through holes of the second rotor segment by means of position variation; and the turbulence blocks in the first axial through holes of the first rotor segment can be axially aligned with the second gaps in the second axial through holes of the second rotor segment, thereby achieving a better cooling effect.

Afterward, in step 914, the method 600 comprises connecting the first rotor segment with the second rotor segment. The rotor can be manufactured through connection and subsequent operations. It can be understood that one or more steps may be added or omitted without departing from the scope of the present application. For example, before step 912, a number of rotor segments may be directly formed and placed in an appropriate manner; and a rotor with staggered turbulence blocks can be directly formed by selecting rotor segments at an appropriate angle. One skilled in the art can reasonably adjust the production steps to achieve the object of the present application. In some other embodiments, the structure of each rotor segment itself may be different; and different arrangements of the turbulence blocks can be done by direct stacking.

One or a plurality of the above embodiments provide a setup of cooling passages for a rotor and a complete set of cooling system for the rotor and the stator. A better cooling effect can be achieved through the staggered turbulence blocks in the passages. In addition, the cooling of both the rotor and the stator can be simultaneously implemented by an integral cooling system, which not only enhances the coolant efficiency, the cooling effect of the stator is also improved. Since the structure of the plurality of laminates is the same, only one die is needed to manufacture the laminates, thereby reducing the production cost. Various changes, modifications, and alterations can be made by those skilled in the art to these specific embodiments without departing from the essence and scope defined in the claims of the present application.

Specific combinations and sub-combinations considered novel and non-obvious are specifically pointed out in the claims. These claims may involve "an" element or "a first" element or similar features. Such claims should be understood as including one or a plurality of such elements, where two or a plurality of such elements are neither required nor excluded. Other combinations and sub-combinations of features, functions, elements, and/or properties described may be claimed through amendment of the current claims or presentation of new claims in the present application or a related application. Such claims, whether broader or narrower than, equivalent to, or different from the original claims, should be regarded as included within the subject matter of the present application.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A motor rotor, comprising:
a first rotor segment defining a plurality of first axial through holes, each first axial through hole comprising a first group of turbulence blocks distributed circumferentially, a plurality of first turbulence blocks of the first group of turbulence blocks being spaced apart by first gaps; and
a second rotor segment, the second rotor segment defining a plurality of second axial through holes, each second axial through hole comprising a second group of turbulence blocks distributed circumferentially, a plurality of second turbulence blocks of the second group of turbulence blocks being spaced apart by second gaps, wherein the first turbulence blocks are at least partially aligned with the second gaps and the second turbulence blocks are at least partially aligned with the first gaps;
wherein the rotor comprises a plurality of pairs of first magnets and second magnets embedded therein and forming a V shape on a cross section of the rotor;
wherein an axial cooling passage is provided with a first cooling inner wall adjacent to the first magnets and a second cooling inner wall adjacent to the second magnets;
wherein the plurality of turbulence blocks are formed on the first cooling inner wall and the second cooling inner wall; and
wherein the first cooling inner wall forms a part of the first axial through hole of the first rotor segment and comprises N turbulence blocks, and the second cooling inner wall comprises (N−1) turbulence blocks, wherein the first cooling inner wall, forming a part of the first axial through hole, of the second rotor segment comprises N turbulence blocks, and the second cooling inner wall comprises (N−1) turbulence blocks, the turbulence blocks of the first rotor segment being staggered from those of the second rotor segment, wherein N is an integer greater than one.

2. The rotor according to claim 1, wherein the plurality of turbulence blocks of two adjacent groups have different lengths.

3. The rotor according to claim 1 wherein the plurality of turbulence blocks of two adjacent groups are staggered from each other along the axial direction.

4. The rotor according to claim 1 wherein the first cooling inner walls of the axial cooling passages are parallel with the first magnets, the second cooling inner walls are parallel with the second magnets, and the axial cooling passages further comprise third cooling inner walls connecting the first cooling inner walls and the second cooling inner walls.

5. The rotor according to claim 1, wherein:
the first rotor segments and the second rotor segments each comprise a plurality of electromagnetic steel sheets;
the rotor comprises a first plurality of first rotor segments and a second plurality of second rotor segments; and
the plurality of turbulence blocks are protrusions in the axial cooling passages.

6. A motor cooling system, comprising:
a first end cap located at a first end of a motor;
a first coolant pipeline being formed on the first end cap;
a coolant inlet located at the first end of the motor and connected with the first coolant pipeline;
a second end cap located at a second end of the motor;
a second coolant pipeline being formed on the second end cap; and
a rotor body defining a plurality of axial cooling passages between the first end cap and the second end cap and in fluid communication with the first coolant pipeline and the second coolant pipeline, wherein the rotor body comprises superposed first rotor segments and second rotor segments, the axial cooling passages formed by first axial through holes in the first rotor segments and first axial through holes in the second rotor segments, wherein inner walls of the axial cooling passages comprise a plurality of protruding turbulence blocks, the plurality of turbulence blocks comprising a first group of turbulence blocks distributed circumferentially to form a first row and a second group of turbulence blocks distributed circumferentially to form a second row, the first row and the second row being adjacent in an axial direction, and the first group of turbulence blocks and the second group of turbulence blocks being staggered in an axial direction;
wherein the first coolant pipeline comprises a first group of radial passages and a second group of radial passages, wherein outlets of the first group of radial passages face a stator of the motor to transfer coolant to the stator;
wherein the second group of radial passages are in communication with the plurality of axial cooling passages to transfer the coolant; and
wherein the second coolant pipeline comprises a third group of radial passages, wherein outlets of the third group of radial passages face the stator of the motor to transfer the coolant to the stator.

7. The motor cooling system according to claim 6, wherein:
the rotor body comprises at least one first rotor segment and one second rotor segment formed by stacking a plurality of laminates the first rotor segment defines a plurality of first axial through holes;
the second rotor segment defines a plurality of second axial through holes;
the plurality of first axial through holes and second axial through holes are aligned to form the plurality of axial cooling passages;
the first group of turbulence blocks with first gaps are formed in the first axial through holes;
the second group of turbulence blocks with second gaps are formed in the second axial through holes; and
the first segment is rotated coaxially relative to the second segment such that the turbulence blocks in the first axial through holes are aligned with the second gaps in the second axial through holes and the turbulence blocks in the second axial through holes are aligned with the first gaps in the first axial through holes.

8. The motor cooling system according to claim 7, wherein:
the plurality of turbulence blocks are distributed along an entire length of an axial direction of the rotor; and
in the axial direction, two adjacent groups of turbulence blocks are staggered and are not aligned.

9. The motor cooling system according to claim 6, wherein the first coolant pipeline comprises an annular distribution passage in communication with the axial cooling passages.

10. The motor cooling system according to claim 9, wherein the annular distribution passage comprises an inner annular passage and an outer annular passage, a first group of distribution pipes in communication with the coolant inlet and the inner annular passage and a second group of distribution pipes in communication with the inner annular passage and the outer annular passage, wherein the outer annular passage is in communication with the axial cooling passages.

11. The motor cooling system according to claim 9, wherein the annular distribution passage is configured as an annular groove formed on the first end cap.

12. The motor cooling system according to claim 6, wherein the motor cooling system further comprises a housing for accommodating the motor and a coolant outlet located on the housing.

13. A motor rotor, comprising:
a first rotor segment defining a plurality of first axial through holes, each first axial through hole comprising a first group of turbulence blocks distributed circumferentially, a plurality of first turbulence blocks of the first group of turbulence blocks being spaced apart by first gaps; and
a second rotor segment, the second rotor segment defining a plurality of second axial through holes, each second axial through hole comprising a second group of turbulence blocks distributed circumferentially, a plurality of second turbulence blocks of the second group of turbulence blocks being spaced apart by second gaps,
wherein the first turbulence blocks are at least partially aligned with the second gaps and the second turbulence blocks are at least partially aligned with the first gaps, and wherein the plurality of turbulence blocks of two adjacent groups have different heights.

14. The rotor according to claim 13, wherein:
the first axial through holes and the second axial through holes are aligned to form axial cooling passages; and
the first rotor segment and the second rotor segment rotate around a central axis such that the first turbulence blocks are at least partially aligned with the second gaps and the second turbulence blocks are at least partially aligned with the first gaps.

15. The rotor according to claim 14, wherein:
the first rotor segments and the second rotor segments are respectively formed by superposing a plurality of electromagnetic steel sheets;
the rotor is formed by superposing a plurality of first rotor segments and second rotor segments;
the plurality of turbulence blocks are protrusions in the axial cooling passages; and
the plurality of turbulence blocks of two adjacent groups are staggered from each other along the axial direction.

16. The rotor according to claim 13, wherein:
the rotor comprises a plurality of pairs of first magnets and second magnets embedded therein;
an axial cooling passage is provided with a first cooling inner wall adjacent to the first magnets and a second cooling inner wall adjacent to the second magnets; and
the plurality of turbulence blocks are formed on the first cooling inner wall and the second cooling inner wall.

17. The rotor according to claim 16, wherein:
the first magnets and the second magnets form a V shape on a cross section of the rotor;
the first cooling inner walls of the axial cooling passages are parallel with the first magnets;
the second cooling inner walls are parallel with the second magnets, and
the axial cooling passages further comprise third cooling inner walls connecting the first cooling inner walls and the second cooling inner walls.

18. The rotor according to claim 17, wherein the first cooling inner wall forms a part of the first axial through hole of the first rotor segment and comprises N turbulence blocks, and the second cooling inner wall comprises (N−1) turbulence blocks, wherein the first cooling inner wall, forming a part of the first axial through hole, of the second rotor segment comprises N turbulence blocks, and the second cooling inner wall comprises (N−1) turbulence blocks; and in a mounting process, the turbulence blocks of the first rotor segment are aligned with those of the second rotor segment; and then the first rotor segment is rotated for 180° to enable the turbulence blocks thereof to be staggered from those of the second rotor segment, wherein N is an integer greater than one.

19. The rotor according to claim 17, wherein the first axial through holes of the first rotor segment comprise a first group of first axial through holes and a second group of first axial through holes located on two sides of a diameter and are symmetrical relative to the diameter, wherein the first and second cooling inner walls of the first group of first axial through holes comprise N turbulence blocks, and the first and second cooling inner walls of the second group of first axial through holes comprise (N−1) turbulence blocks; the second axial through holes of the second rotor segment comprise a third group of second axial through holes and a fourth group of second axial through holes located on two sides of a diameter and are symmetrical relative to the diameter, wherein first and second cooling inner walls of the third group of second axial through holes comprise N turbulence blocks, and first and second cooling inner walls of the fourth group of second axial through holes comprise (N−1) turbulence blocks; and in a mounting process, the first rotor segment is rotated coaxially such that the first group of first axial through holes of the first rotor segment are aligned with the fourth group of second axial through holes to form the axial cooling passages, such that the N turbulence blocks and the (N−1) turbulence blocks are adjacent to and staggered from each other in the axial direction of the axial cooling passages, wherein N is an integer greater than one.

* * * * *